US010487166B2

(12) United States Patent
Yang et al.

(10) Patent No.: US 10,487,166 B2
(45) Date of Patent: Nov. 26, 2019

(54) AQUEOUS POLYMER DISPERSION AND PROCESS OF MAKING THE SAME

(71) Applicant: Dow Global Technologies LLC, Midland, MI (US)

(72) Inventors: Xiaohong Yang, Shanghai (CN); Yawei Xu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 221 days.

(21) Appl. No.: 15/535,103

(22) PCT Filed: Dec. 19, 2014

(86) PCT No.: PCT/CN2014/094339
§ 371 (c)(1),
(2) Date: Jun. 12, 2017

(87) PCT Pub. No.: WO2016/095197
PCT Pub. Date: Jun. 23, 2016

(65) Prior Publication Data
US 2017/0321059 A1  Nov. 9, 2017

(51) Int. Cl.
| | | |
|---|---|---|
| *C08F 265/06* | (2006.01) | |
| *C08L 33/02* | (2006.01) | |
| *C08L 33/06* | (2006.01) | |
| *C09D 151/00* | (2006.01) | |
| *C09D 4/06* | (2006.01) | |
| *C08F 2/22* | (2006.01) | |
| *C08F 220/06* | (2006.01) | |
| *C08F 220/14* | (2006.01) | |
| *C08F 220/18* | (2006.01) | |
| *C08F 220/58* | (2006.01) | |
| *C08F 230/02* | (2006.01) | |
| *C09D 5/02* | (2006.01) | |
| *C09D 7/65* | (2018.01) | |
| *C09D 133/08* | (2006.01) | |
| *C08L 33/04* | (2006.01) | |
| *C08L 33/08* | (2006.01) | |
| *C08L 33/10* | (2006.01) | |
| *C08L 33/14* | (2006.01) | |
| *C08L 33/24* | (2006.01) | |

(52) U.S. Cl.
CPC .............. *C08F 265/06* (2013.01); *C08F 2/22* (2013.01); *C08F 220/06* (2013.01); *C08F 220/14* (2013.01); *C08F 220/18* (2013.01); *C08F 220/58* (2013.01); *C08F 230/02* (2013.01); *C08L 33/02* (2013.01); *C08L 33/06* (2013.01); *C09D 4/06* (2013.01); *C09D 5/024* (2013.01); *C09D 5/027* (2013.01); *C09D 7/65* (2018.01); *C09D 133/08* (2013.01); *C09D 151/00* (2013.01); *C08L 33/04* (2013.01); *C08L 33/064* (2013.01); *C08L 33/08* (2013.01); *C08L 33/10* (2013.01); *C08L 33/14* (2013.01); *C08L 33/24* (2013.01); *C08L 2201/54* (2013.01)

(58) Field of Classification Search
CPC ........ C08F 265/06; C08F 2/22; C08F 220/06; C08F 220/14; C08F 220/18; C08F 220/58; C08F 230/02; C09D 151/00; C09D 133/08; C09D 7/65; C09D 4/06; C09D 5/024; C09D 5/027; C08L 33/06; C08L 33/02; C08L 2201/54; C08L 33/24; C08L 33/14; C08L 33/10; C08L 33/08; C08L 33/064; C08L 33/04
USPC ........................................................ 524/850
See application file for complete search history.

(56) References Cited

U.S. PATENT DOCUMENTS

| | | | |
|---|---|---|---|
| 4,654,397 | A | 3/1987 | Mueller-Mall et al. |
| 4,876,313 | A | 10/1989 | Lorah |
| 5,270,380 | A | 12/1993 | Adamson et al. |
| 5,962,571 | A | 10/1999 | Overbeek et al. |
| 6,872,789 | B2 | 3/2005 | Brinkhuis et al. |
| 7,569,636 | B2 | 8/2009 | Tennebroek et al. |
| 8,013,050 | B2 | 9/2011 | Mestach et al. |
| 8,501,855 | B2 | 8/2013 | Dombrowski et al. |
| 2003/0199629 | A1 | 10/2003 | Gelman et al. |
| 2004/0039109 | A1 | 2/2004 | Buckmann et al. |
| 2005/0107527 | A1 | 5/2005 | Holub et al. |
| 2006/0217483 | A1 | 9/2006 | Tennebroek et al. |
| 2008/0146724 | A1 | 6/2008 | Bohling et al. |
| 2009/0143528 | A1 | 6/2009 | Mestach et al. |
| 2011/0237736 | A1 | 9/2011 | Roller et al. |
| 2012/0252972 | A1 | 10/2012 | Balk et al. |
| 2014/0005322 | A1 | 1/2014 | Akkerman et al. |
| 2014/0018473 | A1 | 1/2014 | Ratering et al. |
| 2014/0323608 | A1 | 10/2014 | Deller et al. |

(Continued)

FOREIGN PATENT DOCUMENTS

| | | |
|---|---|---|
| CA | 02611131 A1 | 12/2006 |
| CN | 104169078 A | 11/2014 |

(Continued)

OTHER PUBLICATIONS

Leo, A. J.; Chemical Reviews, vol. 93, Issue No. 4, p. 1281 (1993).

(Continued)

*Primary Examiner* — Angela C Scott
(74) *Attorney, Agent, or Firm* — Karl E. Stauss; Cantor Colburn LLP

(57) ABSTRACT

An aqueous polymer dispersion, a process of preparing the aqueous polymer dispersion, and an aqueous coating composition comprising the aqueous polymer dispersion; and the aqueous coating composition capable of providing coating films with good properties including coffee resistance and early block resistance.

14 Claims, No Drawings

(56) References Cited

U.S. PATENT DOCUMENTS

2015/0004420 A1     1/2015   Hill et al.
2016/0355698 A1    12/2016   Harris et al.

FOREIGN PATENT DOCUMENTS

| | | |
|---|---|---|
| EP | 1686160 A1 | 8/2006 |
| EP | 2159235 A1 | 3/2010 |
| TW | 201245357 A | 11/2012 |
| WO | 2010027487 A1 | 3/2010 |
| WO | 2012087920 A1 | 6/2012 |
| WO | 2012130712 A1 | 10/2012 |
| WO | 2013087461 A1 | 6/2013 |
| WO | 2013113936 A1 | 8/2013 |
| WO | 2014190515 A1 | 12/2014 |

OTHER PUBLICATIONS

Polymer Handbook, J. Brandrup and E.H. Immergut, Interscience Pulbishers.
International Search Report for International Application No. PCT/CN2014/094339; Date of Filing: Dec. 19, 2014; dated Jul. 17, 2015; 3 pages.
International Search Report for International Application No. PCT/CN2015/090902; Date fo Filing: Sep. 28, 2015; dated Dec. 28, 2015; 4 pages.
Written Opinion for the International Searching Authority for International Application No. PCT/CN2015/090902; Date fo Filing: Sept, 28, 2015; dated Dec. 28, 2015; 4 pages.
Written Opinion of the International Searching Authority for International Application No. PCT/CN2014/094339; Date of Filing: Dec. 19, 2014; dated Jul. 17, 2015; 4 pages.

US 10,487,166 B2

AQUEOUS POLYMER DISPERSION AND PROCESS OF MAKING THE SAME

FIELD OF THE INVENTION

The present invention relates to an aqueous polymer dispersion and a process of making the same.

INTRODUCTION

Matt pigmented coatings comprising binders, matting agents, and pigments usually have a gloss level of below 30 on a 60° Gardner Gloss scale. Porous matting agents and pigments such as titanium dioxide ($TiO_2$) introduce defects into dry coating films. It is a challenge for matt pigmented white coatings to meet industry requirements for coffee resistance. For example, conventional 1K waterborne acrylic coating compositions usually cannot provide matt pigmented white top coat with sufficient coffee resistance to meet industry requirements. Customers in the industry have to use an off-white or even yellowish white top coat, or use a coating system comprising a white pigmented primer/mid coat and a clear top coat, which compromise visual appearance of coatings and/or manufacturing time and cost. Waterborne coatings also need to have satisfactory handling properties. For example, an early block resistance of C-0 or better according to the GB/T 23982-2009 standard increases production efficiency and avoids potential coatings damages when separating two coated surfaces that are stacked or placed in contact with one another during storage, packaging and/or shipping. Moreover, waterborne coatings in many applications such as architectural and industrial coatings are also required to have sufficient water-resistance, 48% alcohol resistance, and stain resistance to other contaminations to meet industry requirements. WO 2014/190515 A1 discloses a polymer dispersion and a wood coating composition comprising thereof. The polymer dispersion comprises polymer particles comprising, as polymerized units, a (meth) acrylate $C_6$-$C_{22}$ alkyl ester nonionic monomer, a self-crosslinking monomer such as diacetone acrylamide, a reactive silicone, and a reactive surfactant. The obtained coating showed improved water repellency, but the coffee resistance of the coating still needs to be improved.

Therefore, it is desirable to provide an aqueous polymer dispersion useful as a binder that is able to provide coating films with desirable coffee resistance as well as other desirable properties described above.

SUMMARY OF THE INVENTION

The present invention provides a novel aqueous multistage polymer dispersion that is useful as binders in coating applications, particularly in matt pigmented coatings. A process for preparing the aqueous multistage polymer dispersion includes a multistage free-radical polymerization. Coating compositions comprising the aqueous multistage polymer dispersion of the present invention provides coating films with good coffee resistance to show a delta E value of 0.6 or lower according to the test method described in the Examples section or a coffee resistance level of 4 or higher according to the BS EN 12720:2009 test method. In some embodiments, the coating films also show one or more of the following properties: an early block resistance level of B-1 or higher according to the GB/T 23982-2009 method; an alcohol resistance level of at least 3 according to the BS EN 12720:2009 method; a water resistance level of at least 4 according to the BS EN 12720:2009 method; and good stain resistance to other contaminants such as green tea, black tea, wine, vinegar and sauce, that is, at a level of 2 or lower according to the GB/T4893.1-2005 method.

In a first aspect, the present invention is an aqueous dispersion of a multistage polymer, wherein the multistage polymer comprises:

(A) a polymer A comprises as polymerized units, based on the weight of the polymer A, (a1) from 75% to 92% by weight of a hydrophilic (meth) acrylic acid alkyl ester:

(a2) from 2.1% to 10% by weight of a carbonyl-containing functional monomer; and (a3) from 5% to 15% by weight of an acid monomer comprising from 4% to 14% by weight of an α, β-ethylenically unsaturated carboxylic acid and from 1% to 9% by weight of a phosphorous-containing acid monomer, and wherein the polymer A has a number average molecular weight of from 3,000 to 100,000; and (B) a polymer B comprises as polymerized units, based on the weight of the polymer B, (b1) from 81% to 99% by weight of a hydrophobic monomer selected from a vinyl aromatic monomer, a hydrophobic (meth)acrylic acid alkyl ester, or mixtures thereof;

(b2) from 0.8% to 10% by weight of a carbonyl-containing functional monomer; and (b3) from 0 to 15% by weight of a hydrophilic monomer;

wherein the polymer B has a glass transition temperature at least 40° C. lower than that of the polymer A, and the weight ratio of the polymer A to the polymer B is from 25:75 to 50:50.

In a second aspect, the present invention is a process of preparing an aqueous dispersion of a multistage polymer by a multistage free-radical polymerization. The process comprises:

(i) preparing a polymer A in an aqueous medium by a free-radical polymerization in the presence of a chain transfer agent and neutralizing the obtained polymer A to a pH value of at least 6, wherein the polymer A comprises as polymerized units, based on the weight of the polymer A.

(a1) from 75% to 92% by weight of a hydrophilic (meth) acrylic acid alkyl ester:

(a2) from 2.1% to 10% by weight of a carbonyl-containing functional monomer; and (a3) from 5% to 15% by weight of an acid monomer comprising from 4% to 14% by weight of an α, β-ethylenically unsaturated carboxylic acid and from 1% to 9% by weight of a phosphorous-containing acid monomer, and (ii) preparing a polymer B in the presence of the polymer A obtained from step (i) by a free-radical polymerization, wherein the polymer B comprises as polymerized units, based on the weight of the polymer B, (b1) from 81% to 99% by weight of a hydrophobic monomer selected from a vinyl aromatic monomer, a hydrophobic (meth)acrylic acid alkyl ester, or mixtures thereof;

(b2) from 0.8% to 10% by weight of a carbonyl-containing functional monomer; and (b3) from 0 to 15% by weight of a hydrophilic monomer:

wherein the polymer B has a glass transition temperature at least 40° C. lower than that of the polymer A, and the weight ratio of the polymer A to the polymer B is from 25:75 to 50:50.

In a third aspect, the present invention is a process of preparing an aqueous dispersion of a multistage polymer by a multistage free-radical polymerization. The process comprises:

(i) preparing a polymer B in an aqueous medium in the presence of a surfactant by a free-radical polymerization, wherein the polymer B comprises as polymerized units, based on the weight of the polymer B, (b1) from 81% to 99% by weight of a hydrophobic monomer selected from a vinyl aromatic monomer, a hydrophobic (meth)acrylic acid alkyl ester, or mixtures thereof;

(b2) from 0.8% to 10% by weight of a carbonyl-containing functional monomer; and (b3) from 0 to 15% by weight of a hydrophilic monomer; and (ii) preparing a polymer A by a free-radical polymerization in the presence of a chain transfer agent, wherein the polymer A comprises as polymerized units, based on the weight of the polymer A, (a1) from 75% to 92% by weight of a hydrophilic (meth)acrylic acid alkyl ester:

(a2) from 2.1% to 10% by weight of a carbonyl-containing functional monomer; and (a3) from 5% to 15% by weight of an acid monomer comprising from 4% to 14% by weight of an α, β-ethylenically unsaturated carboxylic acid and from 1% to 9% by weight of a phosphorous-containing acid monomer;

wherein the polymer B has a glass transition temperature at least 40° C. lower than that of the polymer A, and the weight ratio of the polymer A to the polymer B is from 25:75 to 50:50.

In a fourth aspect, the present invention is an aqueous coating composition comprising the aqueous dispersion of a multistage polymer of the first aspect.

DETAILED DESCRIPTION OF THE INVENTION

"Hydrophobic" monomer in the present invention refers to a monomer that has a Hansch value ≥2.20. "Hydrophilic" monomer in the present invention refers to a monomer that has a Hansch value <2.20. Hansch values may be determined by the method described by A. J. Leo in Chem. Rev., Volume 93, Issue No. 4, page 1281 (1993).

Glass transition temperature ($T_g$) values in the present invention are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of $M_1$, and $T_g(M_2)$ is the glass transition temperature of the homopolymer of $M_2$, all temperatures being in K. The glass transition temperatures of monomers may be found, for example, in "Polymer Handbook", edited by J. Brandrup and E. H. Immergut. Interscience Publishers.

The multistage polymer in the aqueous dispersion of the present invention comprises a polymer A and a polymer B. The polymer A useful in the present invention may comprise, as polymerized units, one or more hydrophilic (meth)acrylic acid alkyl esters (a1). The hydrophilic (meth)acrylic acid alkyl ester may be a (meth)acrylic acid alkyl ester having a $C_1$ to $C_2$ alkyl group. Examples of suitable hydrophilic (meth)acrylic acid alkyl esters include methyl (meth)acrylate, ethyl (meth)acrylate, or mixtures thereof. Preferred hydrophilic (meth)acrylic acid alkyl esters are methyl methacrylate, ethyl acrylate, or mixtures thereof. The polymer A may comprise, based on the weight of the polymer A, 75% by weight or more of the copolymerized hydrophilic (meth) acrylic acid alkyl ester, 80% by weight or more, or even 86% by weight or more, and at the same time, 92% by weight or less, or even 90% by weight or less.

The polymer A useful in the present invention may also comprise, as polymerized units, one or more carbonyl-containing functional monomers (a2). Examples of suitable carbonyl-containing functional monomers include, for example, diacetone acrylamide (DAAM), acetoacetoxyethyl (meth)acrylate, acetoacetoxypropyl (meth)acrylate, acetoacetoxybutyl (meth)acrylate, 2,3-di(acetoacetoxy) propyl (meth)acrylate, allyl acetoacetates, vinyl acetoacetates, acetoacetamides of Formula (I):

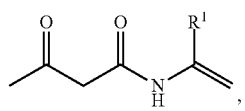

wherein $R^1$ is H or methyl, or a combination thereof. Preferably, an ethylenically unsaturated monomer bearing a carbonyl group such as DAAM or acetoacetoxyethyl (meth) acrylate is used as the monomer (a2). The carbonyl-containing functional monomer may be used as a self-crosslinking agent. The polymer A may comprise, based on the weight of the polymer A, 2.1% by weight or more of the copolymerized carbonyl-containing functional monomer, 3% by weight or more, or even 4% by weight or more, and at the same time, 10% by weight or less, or even 6% by weight or less.

The polymer A useful in the present invention may further comprise as polymerized units, acid monomers (a3) comprising one or more α, β-ethylenically unsaturated carboxylic acids and phosphorous-containing acid monomers. The combined concentration of the copolymerized acid monomers in the polymer A may be, based on the weight of the polymer A, 5% by weight or more, 7% by weight or more, or even 9% by weight or more, and at the same time, 15% by weight or less, 13% by weight or less, or even 11% by weight or less.

Examples of suitable α, β-ethylenically unsaturated carboxylic acids include an acid-bearing monomer such as (meth)acrylic acid, itacolic acid, or fumaric acid; or a monomer bearing an acid-forming group which yields or is subsequently convertible to, such an acid group (such as anhydride, (meth)acrylic anhydride, or maleic anhydride); or mixtures thereof. The polymer A may comprise, based on the weight of the polymer A, 4% by weight or more of the copolymerized α, β-ethylenically unsaturated carboxylic acids, 5% by weight or more, or even 6.8% by weight or more, and at the same time 14% by weight or less, 10% by weight or less, or even 8% by weight or less.

Examples of suitable phosphorous-containing acid monomers include phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R)-C(O)-O-(R_1O)_n-P(O)(OH)_2$, wherein R=H or $CH_3$ and $R_1$=alkyl, such as SIPOMER™ PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomers are dihydrogen phosphate monomers, which include 2-phosphoethyl (meth)acrylate, 2-phosphopropyl (meth)acrylate, 3-phosphopropyl (meth)acrylate, 3-phospho-2-hydroxypropyl (meth)acrylate, SIPOMER PAM-100, SIPOMER PAM-200, SIPOMER PAM-300, or mixtures thereof. The polymer A may comprise, based on the weight of the polymer A, 1% by weight or more of the copolymerized phosphorous-containing acid monomers, or 3% by weight or more, and at the same time, 9% by weight or less, 6% by weight or less, or even 4% by weight or less.

The polymer A useful in the present invention may have a $T_g$ of from 60 to 110° C. or from 70° C. to 110° C. The polymer A in the multistage polymer may have a number average molecular weight ($M_n$) of 3,000 or more, 4,500 or more, 5,000, or even or more, and at the same time, 100,000 or less, 50,000 or less, 30.000, or even 20.000 or less. In some embodiments, the polymer A is an oligomer. "Oligomer" herein refers to a polymer having a $M_n$ of from 3,000 to 30,000. $M_n$ may be determined by Gel Permeation Chromatography (GPC) analysis or calculated as follows.

$$Mn=[W(\text{monomer})+W(\text{CTA})]/\text{Mole}(\text{CTA}),$$

wherein W(monomer) is the total weight of monomers used in preparing the polymer A, W(CTA) is the total weight of a chain transfer agent used in preparing the polymer A, and Mole(CTA) is the total moles of the chain transfer agent used in preparing the polymer A.

The polymer B useful in the present invention may comprise, as polymerized units, one or more hydrophobic monomers (b1) selected from a vinyl aromatic monomer, a hydrophobic (meth)acrylic acid alkyl ester, or mixtures thereof. Examples of suitable hydrophobic monomers include styrene or substituted styrene, butyl (meth)acrylate, iso-butyl (meth)acrylate, 2-ethylhexyl acrylate, lauryl (meth)acrylate, stearyl (meth)acrylate, or mixtures thereof. Preferred hydrophobic monomers are styrene, 2-ethylhexyl acrylate, or mixtures thereof. The polymer B may comprise, based on the weight of the polymer B, 81% by weight or more of the copolymerized hydrophobic monomers, 85% by weight or more, or even 90% by weight or more, and at the same time, 99% by weight or less or 96% by weight or less.

The polymer B may also comprise, as polymerized units, one or more carbonyl-containing functional monomers (b2). Examples of suitable carbonyl-containing functional monomers (b2) include those carbonyl-containing functional monomers (a2) as described in the polymer A section above. The carbonyl-containing functional monomer (b2) in preparing the polymer B may be the same as, or different from the carbonyl-containing functional monomer (a2) used in preparing the polymer A. Preferably, DAAM, acetoacetoxyethyl (meth)acrylate, or a mixture thereof is used as the carbonyl-containing functional monomer (b2). The polymer B may comprise, based on the weight of the polymer B, 0.8% by weight or more of the copolymerized carbonyl-containing functional monomers, 1.5% by weight or more, or even 2.0% by weight or more, and at the same time, 10% by weight or less, 8% by weight or less, or even 6% by weight or less.

The polymer B may further comprise, as polymerized units, one or more hydrophilic monomers (b3). Examples of suitable hydrophilic monomers include methyl (meth)acrylate, ethyl (meth)acrylate, or mixtures thereof. The polymer B may comprise, based on the weight of the polymer B, up to 15% by weight of the copolymerized hydrophilic monomer, 12% by weight or less, or even 8% by weight or less.

The polymer B useful in the present invention may have a $T_g$ at least 40° C. lower than that of the polymer A. The polymer B may have a $T_g$ of −20° C. or higher, from −15° C. to 60° C. or from −10° C. to 40° C. The weight ratio of the polymer A to the polymer B may be in the range of from 25:75 to 50:50 or from 30:70 to 40:60.

In some preferred embodiments, the multistage polymer in the aqueous dispersion of the present invention comprises the polymer A which comprises as polymerized units, based on the weight of the polymer A, (a1) from 80% to 90% by weight of the hydrophilic (meth)acrylic acid alkyl ester such as methyl (meth)acrylate, ethyl (meth)acrylate, or mixtures thereof.

(a2) from 3% to 6% by weight of the carbonyl-containing functional monomer such as DAAM and acetoacetoxyethyl (meth)acrylate; and (a3) from 7% to 13% by weight of the acid monomer, wherein the acid monomer comprises from 5% to 10% by weight of the α, β-ethylenically unsaturated carboxylic acid such as meth)acrylic acid, itacolic acid, fumaric acid, or mixtures thereof; and from 3% to 6% by weight of the phosphorous-containing acid monomer such as phosphoethyl (meth)acrylate, SIPOMER PAM-100, SIPOMER PAM-200, SIPOMER PAM-300, or mixtures thereof; and the polymer B which comprises as polymerized units, based on the weight of the polymer B, (b1) from 81% to 99% by weight of the hydrophobic monomer selected from a vinyl aromatic monomer, a hydrophobic (meth)acrylic acid alkyl ester, or mixtures thereof including, for example, styrene, substituted styrene, 2-ethylhexyl acrylate, iso-butyl (meth)acrylate, lauryl (meth)acrylate, butyl (meth)acrylate, or mixtures thereof;

(b2) from 2.5% to 10% by weight of the carbonyl-containing functional monomer such as diacetone acrylamide (DAAM), acetoacetoxyethyl (meth)acrylate, or mixtures thereof; and (b3) from 0 to 15% by weight of the hydrophilic monomer such as methyl (meth)acrylate.

The types and levels of the monomers described above may be chosen to provide the multistage polymer with a $T_g$ suitable for different applications. The $T_g$ of the multistage polymer may be in the range of from −30° C. to 70° C. from −20° C. to 60° C., or from −10° C. to 45° C.

In addition to the multistage polymer particles, the aqueous dispersion of the present invention may further comprise a polyfunctional carboxylic hydrazide containing at least two hydrazide groups per molecule. The polyfunctional carboxylic hydrazides may act as a crosslinker and may be selected from adipic dihydrazide, oxalic dihydrazide, isophthalic dihydrazide, polyacrylic polyhydrazide, or mixtures thereof. When present, the concentration of the polyfunctional carboxylic hydrazide may be from 0.5% to 10% by weight, based on the total weight of the polymer A and polymer B.

The aqueous dispersion of the present invention further comprises water. The concentration of water may be, by weight based on the total weight of the aqueous dispersion, from 30% to 90% or from 40% to 80%. The aqueous dispersion of the present invention may be useful in many applications including, for example, wood coatings, architecture coatings, and traffic paints.

The process of preparing the aqueous dispersion of the present invention includes a multistage free-radical polymerization in which at least two stages are formed sequentially, which usually results in the formation of the multistage polymer comprising at least two polymer compositions such as the polymer A and the polymer B. In a preferred embodiment, the present invention provides a self-crosslinkable oligomer stabilized binders with a two-step emulsion polymerization process. The aqueous dispersion of the present invention may be prepared by, a process of first preparing the polymer A followed by preparing the polymer B, or a process of first preparing the polymer B followed by preparing the polymer A. Each stage of the free-radical polymerization can be conducted by polymerization techniques well known in the art such as suspension polymerization or emulsion polymerization of the monomers described above. Emulsion polymerization is a preferred process. For each monomer, types and concentration of the monomer based on the total weight of monomers used in preparing the polymer A or the polymer B is substantially the same as the types and concentration of copolymerized such monomer based on the total weight of the polymer A or the polymer B, respectively. Total weight concentration of monomers for preparing the polymer A and the polymer B, respectively, is equal to 100%. A mixture of the monomers for preparing the polymer A or the polymer B may be added neat or as an emulsion in water; or added in one or more additions or continuously, linearly or nonlinearly, over the reaction period of preparing the polymer A or the polymer B, or combinations thereof. Temperature suitable for emulsion polymerization processes may be lower than 100° C., in the range of from 30 to 95° C. or in the range of from 50 to 90° C.

In the multistage free-radical polymerization process, free radical initiators may be used in each stage. The polymerization process may be thermally initiated or redox initiated emulsion polymerization in each stages. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the multistage free-radical polymerization process, a surfactant may be used for each stage. The surfactant may be added prior to or during the polymerization of the monomers, or combinations thereof. A portion of the surfactant can also be added after the polymerization. Surfactants may be used for both stages or only in the first stage of preparing the multistage polymer. In some embodiments, when the polymer A is prepared prior to the preparation of the polymer B, the polymer A obtained may act as a surfactant to emulsify the monomer mixture for preparing the polymer B. In some preferred embodiments, one portion of the polymer A is used as a surfactant to emulsify the monomer mixture used for preparing the polymer B and the other portion of the polymer A remains in the reactor. The total dosage of surfactants used in the multistage polymerization process of the present invention can be lower than conventional emulsion polymerization processes.

These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The combined amount of the surfactant used is usually from 0.1% to 6% by weight or from 0.3% to 1.5% by weight, based on the weight of total monomers used for preparing the multistage polymer.

In the multistage free-radical polymerization process, a train transfer agent may be used in the stage of preparing the polymer A. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the polymer A. For example, the chain transfer agent may be present in an amount of from 0.3% to 3% by weight, from 1% to 2.5% by weight, or from 1.5% to 2% by weight, based on the total weight of monomers used for preparing the polymer A.

In some embodiments, the process of the present invention includes preparing the polymer A in the presence of the chain transfer agent and neutralizing the obtained polymer A to a pH value of at least 6, from 6 to 10, or from 7 to 9; and then preparing the polymer B in the presence of the polymer A. The pH value of the obtained multistage polymer may be controlled to be at least 7.

In some other embodiments, the process of the present invention is conducted in a reverse order, that is, first preparing the polymer B in an aqueous medium by a free-radical polymerization in the presence of the surfactant, followed by preparing the polymer A in an aqueous medium by a free-radical polymerization in the presence of the chain transfer agent, and neutralizing the obtained multistage polymer to a pH value of at least 7.

The neutralization in the process of the present invention may be conducted by using one or more bases as neutralizers. The bases may lead to partial or complete neutralization of the ionic or latently ionic groups of the polymer A or the multistage polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The process of the present invention may further comprise adding the polyfunctional carboxylic hydrazide containing at least two hydrazide groups per molecule described above into the obtained aqueous dispersion of the multistage polymer.

The aqueous coating composition of the present invention may comprise the aqueous dispersion of the multistage polymer described above. The aqueous multistage polymer dispersion in the coating composition of the present invention may be present, by solids weight based on the total weight of the coating composition, in an amount of 10% or more, 13% or more, or even 15% or more, and at the same time, 30% or less, 28% or less, or even 25% or less.

The aqueous coating composition of the present invention may comprise one or more matting agents. "Matting agents" herein refer to any inorganic or organic particles that provide matt effect. Matting agents usually have an average particle size of 5.5 microns or more according to the ASTM E2651-10 method. The matting agents may be selected from silica matting agents, polyurea matting agents, polyacrylate, polyethylene, polytetrafluoroethene, or mixtures thereof. Suitable commercially available matting agents include, for example, ACEMATT™ TS-100 and ACEMATT OK520 silica matting agents both available from Evonik, DEUTERON™ MK polyurea matting agent available from Deuteron, SYLOID™ Silica 7000 matting agent available from Grace Davison, PARALOID™ PRD 137B emulsion based on polyacrylate available from The Dow Chemical Company; ULTRALUBE™ D277 emulsion based on HDPE/plastic, ULTRALUBE D818 emulsion based on montan/PE/plastic, and ULTRALUBE D860 emulsion based on PE/ester matting agents all available from Keim-Additec; or mixtures thereof. When present, the concentration of the matting agent may be, by solids weight based on the total weight of the coating composition, from 0.1% to 5%, from 0.5% to 4%, or from 0.5% to 3.5%.

The aqueous coating composition of the present invention may also comprise pigments and/or extenders. "Pigments" herein refer to materials that can provide whiteness and color including inorganic pigments and organic pigments. Inorganic pigments typically include metal oxides. Examples of suitable metal oxides include titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. Suitable commercially available $TiO_2$ include, for example, KRONOS™ 2310 available from Kronos Worldwide, Inc., Ti-Purer™ R-706 available from DuPont (Wilmington, Del.), TiONA™ ATI available from Millennium Inorganic Chemicals, or mixtures thereof. $TiO_2$ may be also available in concentrated dispersion form. Organic pigments typically refer to opaque polymers such as ROPAQUE™ Ultra E available from The Dow Chemical Company (ROPAQUE is a trademark of The Dow Chemical Company). "Extenders" herein refer to white transparent or semi-transparent components, whose purpose is to reduce the cost of the paint by increasing the area covered by a given weight of pigment. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, or mixtures thereof. The concentration of the pigments and/or extenders may be, by weight based on the total weight of the coating composition, from 5% to 40%, from 8% to 35%, or from 10% to 30%.

The aqueous coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO™ Airex 902 W and TEGO Foamex 1488 polyether siloxane copolymer emulsions both available from TEGO, BYKT™-024 silicone deformer available from BYK, or mixtures thereof. When present, the concentration of the defoamer may be, by weight based on the total weight of the coating composition, generally from 0.01 to 1%, from 0.05 to 0.8%, or from 0.1 to 0.5%.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR. When present, the concentration of the thickener is, by weight based on the total weight of the aqueous coating composition, generally from 0.05% to 3%, from 0.1% to 2%, or from 0.3% to 1%.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, SURFYNOL™ 104 nonionic wetting agent based on an actacetylenic diol available from Air Products, BYK-346 and BYK-349 polyether-modified siloxanes both available from BYK, or mixtures thereof. When present, the concentration of the wetting agent may be, based on the total weight of the coating composition, from 0.1% to 2.5% by weight, from 0.2% to 2% by weight, or from 0.3% to 1% by weight.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. When present, the concentration of the coalescents may be, by weight based on the total weight of the coating composition, from 0.1% to 10%, from 1% to 9%, or from 3% to 8%.

The aqueous coating composition of the present invention may further comprise water. The concentration of water may be, by weight based on the total weight of the aqueous coating composition, from 30% to 90%, from 40% to 80%, or from 60% to 70%.

In addition to the components described above, the aqueous coating composition of the present invention may further comprise any one or combination of the following additives: buffers, neutralizers, dispersants, humectants, mildewcides, biocides, anti-skinning agents, colorants, flowing agents, anti-oxidants, plasticizers, leveling agents, dispersants, thixotropic agents, adhesion promoters, and grind vehicles. When present, these additives may be present in a combined amount of from 0.001% to 10% by weight, or from 0.01% to 2% by weight, based on the total weight of the coating composition.

The coating composition of the present invention may be prepared with techniques known in the coating art. The process of preparing the aqueous coating composition of the present invention may comprise by admixing the aqueous polymer dispersion with other optional components as described above. Components in the aqueous coating composition may be mixed in any order to provide the aqueous coating composition of the present invention. Any of the above-mentioned optional components may also be added to the composition during or prior to the mixing to form the aqueous coating composition.

The coating composition of the present invention provides the coating obtained therefrom, i.e., the coating film after drying the coating composition applied to a substrate, with good coffee resistance to show a delta E value of 0.6 or lower according to the test method described in the Examples section or a coffee resistance level of 4 or higher according to the BS EN 12720:2009 test method. In some embodiments, the coating also shows one or more of the following properties: an early block resistance level of B-1 or higher according to the GB/T 23982-2009 method; an alcohol resistance level of at least 3 according to the BS EN 12720:2009 method; a water resistance level of at least 4 according to the BS EN 12720:2009 method; and good stain resistance to other contaminants including, for example, green tea (1 hour), black tea (1 hour), wine (1 hour), vinegar (1 hour) and sauce (1 hour), that is, at a level of 2 or lower according to the GB/T4893.1-2005 method. A method of preparing the coating may comprise forming the aqueous coating composition of the present invention, applying the aqueous coating composition to a substrate, and drying the applied coating composition to form the coating.

A process of using the aqueous coating composition of the present invention may comprise the following: applying the coating composition to a substrate, and drying the applied coating composition. The coating composition of the present invention can be applied to a substrate by incumbent means including brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition may be dried, or be allowed to dry, at room temperature (20-25° C.), or at an elevated temperature, for example, from 35° C. to 60° C. to form a film (this is, coating).

The aqueous coating composition of the present invention can be applied to, and adhered to, various substrates. Examples of suitable substrates include wood, metals, plastics, foams, stones, elastomeric substrates, glass, fabrics, concrete, or cementious substrates. The coating composition is suitable for various coating applications, such as marine and protective coatings, automotive coatings, wood coatings, coil coatings, plastic coatings, powder coatings, can coatings, and civil engineering coatings. The aqueous coating composition is particularly suitable for industrial coatings. The aqueous coating composition can be used alone, or in combination with other coatings to form multi-layer coatings.

EXAMPLES

Some embodiments of the invention will now be described in the following Examples, wherein all parts and percentages are by weight unless otherwise specified. The following materials are used in the examples:

2-ethylhexyl acrylate ("EHA"), Acrylic acid ("AA"), methacrylic acid ("MAA"), styrene ("ST"), methyl methacrylate ("MMA"), sodium styrene sulfonate ("SSS"), ammonium persulfate ("APS"), and methyl 3-mercaptopropanoate ("MMP") are all available from Sinoreagent Group.

Diacetone acrylamide ("DAAM") and adipic dihydrazide ("ADH") are both available from Kyowa Hakko Chemical Co., Ltd.

Phosphoethyl methacrylate ("PEM") is available from The Dow Chemical Company.

Acetoacetoxyethyl methacrylate ("AAEM") is available from Eastman.

DISPONIL™ Fes-32 surfactant ("Fes-32"), available from BASF, is a sodium salt of fatty alcohol ether sulphate.

POLYSTEP P-12A surfactant ("P-12A"), available from Stepan, is polyethylene glycol monotridecyl ether ammonium salt.

AMP™-95, available from The Dow Chemical Company, is 2-amino-2-methyl-1-propanol and used as a neutralizer (AMP is a trademark of The Dow Chemical Company).

OROTAN™ 731 A, available from The Dow Chemical Company, is a sodium salt of a hydrophobic acrylic copolymer and used as a dispersant (OROTAN is a trademark of The Dow Chemical Company).

TEGO 1488, available from Evonik, is an organo-modified siloxane and used as a defoamer.

Ti-Pure R-706, available from DuPont, is titanium dioxide and used as pigments.

DOWANOL™ EB, available from The Dow Chemical Company, is n-butyl ether and used as a coalescent (DOWANOL is a trademark of The Dow Chemical Company).

DOWANOL DPnB, available from The Dow Chemical Company, is dipropylene glycol n-butyl ether ("DPnB") and used as a coalescent.

TEGO Airex 902 W, available from Evonik, is a polyether siloxane copolymer containing fumed silica and used as a defoamer.

BYK CERAFLOUR 929, available from BYK, is a micronized, modified polyethylene and used as a matting agent.

ACRYSOL RM-8W rheology modifier ("RM-8W"), available from The Dow Chemical Company, is a nonionic urethane rheology modifier.

The following standard analytical equipment and methods are used in the Examples.

Minimum Film Formation Temperature (MFFT)

MFFT is measured by a Coesfeld MFFT instrument. The MFFT is measured by casting a 75 µm wet film of an aqueous polymer dispersion on a heating plate that has a gradient temperature. The film is dried and the minimum temperature at which a coherent film is formed is recorded as the MFFT.

Early Block Resistance

Early block resistance is measured according to the GB/T 23982-2009 standard. A wood block (7 cm×5 cm) is balanced at room temperature and 50% humidity for 7 days. One layer of coating is brushed onto the wood block at 80-90 grams per square meter ($g/m^2$) of the wood, cured at room temperature for 3 hours, then sanded with sand paper. The second coating layer is brushed onto the wood block at 80-90 $g/m^2$ and cured at room temperature for 24 hours. Two coated wood blocks are then stacked together face to face with 1 kg weight on them and are placed into an oven at 50° C. for 4 hours. Then, the 1 kg weight is removed and the two stacked wood blocks are balanced at room temperature for 1 hour. The two stacked wood blocks are then separated from each other to evaluate the early block resistance.

The rating of the early block resistance property is defined by the separating force and the area of damaging:

A: separated without any force;
B: separated by a slight blow;
C: separated by low force with hands
D: separated by medium force with hands;
E: separated by huge force with hands;
F: separated by tools The number means area of damage:

0: no damage; 1: ≤1%; 2: 1%-5%; 3: 5%-20%; 4: 20%-50%; 5: ≥50%

A-0 represents the best and F-5 is the worst. The block resistance should be B-1 or better to be acceptable.

Properties of White Coatings

Panels are prepared by brush applying three layers of coats at 80-90 grams per square meter ($gram/m^2$) over wood plates. After the first coat, panels are left at room temperature for 4 hours, and then sanded with sand paper. Then the second coat is applied and dried at room temperature for 4 hours prior to apply the third coat. After the third coat, panels are dried at room temperature for 4 hours, and then placed in an oven at 50° C. for 48 hours before the following tests:

Delta E of White Coatings

For measuring delta E values, disc type filter paper is saturated with 4% instant coffee (Nestle), then is placed on the above finished panels and covered with a cap to reduce evaporation. After 1 hour, the cap is removed. Tested areas are wiped with wet facial tissues, and dried at room temperature for 24 hours prior to measure L, a, b values by a BYK Gardner Spectro-Guide Sphere Gloss Color Spectrophotometer according to the ASTM D2244 method. $L_2$, $a_2$, $b_2$ values are measured on the tested areas. Initial $L_1$, $a_1$, $b_1$ values are measured on blank areas (that is, areas without coffee treatment). Then, delta E ($\Delta E$) value is determined by the following equation, $$\Delta E = \sqrt{(L_1-L_2)^2+(a_1-a_2)^2+(b_1-b_2)^2}$$

The lower $\Delta E$ value, the better the coffee resistance. $\Delta E$ being 0.6 or lower is acceptable.

Stain Resistance of White Coatings to Green Tea, Black Tea, Wine, Vinegar or Sauce Stain resistance of white coating films to other contaminations including green tea, black tea, wine, vinegar or sauce, respectively, is determined by the GB/T4893.1-2005 method. The degree of damage is defined as the following levels. The lower the rating level, the better the stain resistance. The stain resistance being 2 or lower is acceptable.

1—No change: Test area indistinguishable from adjacent surrounding area.

2—Minor change: Test area distinguishable from adjacent surrounding area, only when the light source is mirrored on the test surface and is reflected towards the observer's eye, for example, discoloration; change in gloss and color; and/or no change in the surface structure such as swelling, fiber raising, cracking and/or blistering.

3—Moderate change: Test area distinguishable from adjacent surrounding area, visible in several viewing directions, for example, discoloration; change in gloss and color; and/or no change in the surface structure such as swelling, fiber raising, cracking and/or blistering.

4—Significant change: Test area clearly distinguishable from adjacent surrounding area, visible in all viewing directions, for example, discoloration; change in gloss and color; and/or slightly change in the surface structure such as swelling, fiber raising, cracking and/or blistering.

5—Strong change: The structure of the surface being distinctly changed and/or discoloration, change in gloss and color, and/or the surface material being totally or partially removed, and/or the filter paper adhering to the surface.

Coffee resistance, water resistance, 48% alcohol resistance and paraffin oil resistance of white coatings Coffee resistance, water resistance and 48% alcohol resistance are determined by the BS EN 12720:2009 method, respectively.

Panels are prepared by brush applying three layers of coats at 80-90 $g/m^2$ over wood. The wood is pre-painted with a black colorant to make its L, a and b values in a specific range: L<40, −1<a<1, −1<b<1 (L, a and b values are measured by a BYK Gardner Spectro-Guide Sphere Gloss Color Spectrophotometer). After the first coat, panels are left at room temperature for 4 hours, then sanded with sand paper. The second coating layer is brushed onto the wood substrate and dried at room temperature for 4 hours. After the third coat, panels are dried at room temperature for 4 hours, then placed in an oven at 50° C. for 48 hours before conducting the water resistance, alcohol resistance, or paraffin oil resistance test described below, respectively.

For the coffee resistance test, disc type filter paper is saturated with 4% instant coffee (Nestle), then is placed on the above finished panels and covered with a cap to reduce evaporation. After 1 hour, the cap is removed. Tested areas are wiped with wet facial tissues, and dried at room temperature for 24 hours to observe the degree of damage. The degree of damage is defined as the levels below. The higher the rating level, the better the coffee resistance. The coffee resistance being 4 or above is acceptable.

For the water resistance test, disc type filter paper is first saturated with water. The paper is then placed on the above finished panels and covered with a cap to reduce evaporation. After 24 hours, the cap is removed. Tested areas are wiped with wet facial tissues, and dried at room temperature to observe the degree of damage. The degree of damage is defined as the levels below. The higher the rating level, the better the water resistance. The water resistance being 4 or higher is acceptable.

For the 48% alcohol resistance test, filter discs are saturated with 48% alcohol, then placed on the above finished panels and covered with a cap to reduce evaporation. After 1 hour, the cap is removed. Tested areas are wiped with wet facial tissues, and dried at room temperature to observe the damage degree. The degree of damage is defined as the levels below. The higher the rating level, the better the 48% alcohol resistance. The 48% alcohol resistance being 3 or higher is acceptable.

For the paraffin oil resistance test, disc type filter paper is first saturated with paraffin oil. The paper is then placed on the above finished panels and covered with a cap to reduce evaporation. After 24 hours, the cap is removed. Tested areas are wiped with wet facial tissues, and dried at room temperature to observe the degree of damage. The degree of damage is defined as the levels below. The higher the rating level, the better the paraffin oil resistance. The paraffin oil resistance being 4 or higher is acceptable.

The following levels are used to rate coffee resistance, water resistance, 48% alcohol resistance, and paraffin oil resistance described above, respectively.

5—No change: Test area indistinguishable from adjacent surrounding area.

4—Minor change: Test area distinguishable from adjacent surrounding area, only when the light source is mirrored on the test surface and is reflected towards the observer's eye, for example, discoloration; change in gloss and color, and/or no change in the surface structure such as swelling, fiber raising, cracking and/or blistering.

3—Moderate change: Test area distinguishable from adjacent surrounding area, visible in several viewing directions, for example, discoloration; change in gloss and color; and/or no change in the surface structure such as swelling, fiber raising, cracking and/or blistering.

2—Significant change: Test area clearly distinguishable from adjacent surrounding area, visible in all viewing directions, for example, discoloration; change in gloss and color, and/or slightly change in the surface structure such as swelling, fiber raising, cracking and/or blistering.

1—Strong change: The structure of the surface being distinctly changed and/or discoloration, change in gloss and color, and/or the surface material being totally or partially removed, and/or the filter paper adhering to the surface.

48% Alcohol Resistance of Clear Coatings

Panels are prepared by brush applying three layers of coats at 80-90 g/m² over wood. The wood is pre-painted with a black colorant to make its L, a and b values in a specific range: L<40, −1<a<1, −1<b<1 (L, a and b values are measured by a BYK Gardner Spectro-Guide Sphere Gloss Color Spectrophotometer). After the first coat, panels are left at room temperature for 4 hours, then sanded with sand paper. The second coating layer is brushed onto the wood substrate and dried at room temperature for 4 hours. After the third coat, panels are dried at room temperature for 4 hours, then placed in an oven at 50° C. for 48 hours. The obtained panels are measured and rated according to the same procedure as for measuring 48% alcohol resistance of white coatings. The 48% alcohol resistance of clear coatings being 3 or higher is acceptable.

Gloss

The gloss of coating films is measured according to the ASTM D523 method using a BYK Micro-Tri-Gloss meter.

Hiding Performance

Contrast ratio is a measure of hiding performance. The higher the contrast ratio, the better the hiding performance. Draw-downs of paints with 120 μm film applicator are made and cure at room temperature for 1 day. Then Y-reflectance in three areas over both the white and black areas of a 5 C opacity chart is measured. The contrast ratio is obtained through dividing the reflectance of white area by the reflectance of black area.

Dry Heat Performance

Coated panels to be tested are the same as those used for the coffee resistance test described above. The dry heat test is measured according to the EN 12722:2009 method (testing temperature: 70° C.). The dry heat performance is rated at a level of from 1 to 5. The higher the rating level, the better the dry heat performance. The dry heat performance being 4 or higher is acceptable.

Fastness to Rubbing Performance

Coated panels to be tested are the same as those used for the coffee resistance test described above. The fastness to rubbing performance is measured according to the IOS-TM-0002/4 method (10×9 Newtons). The fastness to rubbing property is rated at a level of from 1 to 5. The higher the rating level, the better the fastness to rubbing performance. The fastness to rubbing performance being 4 or higher is acceptable.

Fat on Scratch Performance

Coated panels to be tested are the same as those used for the coffee resistance test described above. The fat on scratch performance is measured according to the IOS-TM-0002/2 method (3 Newtons+24 hours). The fat on scratch performance is rated at a level of from 1 to 5. The higher the rating level, the better the fat on scratch performance. The fat on scratch performance being 4 or higher is acceptable.

GPC Analysis

GPC analysis is performed generally by an Agilent 1200. A sample is dissolved in tetrahydrofuran (THF)/formic acid (FA)(5%) with a concentration of 2 mg/mL and then filtered through 0.45 μm polytetrafluoroethylene (PTFE) filter prior to GPC analysis. The GPC analysis is conducted using the following conditions:

Column: One Mixed B columns (7.8×300 mm) in tandem. 65#; column temperature: 40☐; mobile phase: THF/FA (5%); flow rate: 1.0 mL/minute; Injection volume: 100 μL; detector. Agilent Refractive Index detector, 40☐; and calibration curve: PL Polystyrene easy vial Narrow standards with molecular weights ranging from 3,053,000 to 580 g/mol, using polynom 5 fitness.

Preparation of Polymer of Stage 1

Aqueous dispersions of multistage polymers were prepared by first preparing polymers of the first stage as follows, Preparation of Oligomer 1 (O1)

Preparation of Monomer Emulsion 1: Fes-32 surfactant (11.61 grams (g), 31% active) was dissolved in deionized water (414.20 g) with stirring. Then MMA, MAA, PEM, DAAM, and MMP, based on dosages described in table 1, were slowly added into the resulting surfactant solution to obtain Monomer Emulsion 1.

A solution containing Fes-32 surfactant (3.87 g, 31% active) and deionized water (1667.4 g) was added into a 4-neck, 5-liter round bottom flask equipped with a thermocouple, a cooling condenser and an agitator, and was heated to 85° C. under nitrogen atmosphere. An aqueous APS initiator solution (0.88 g APS in 56.48 g deionized water), and 5.0% by weight of Monomer Emulsion 1 obtained above were then added into the flask. Within about 5 minutes, initiation of polymerization was confirmed by a temperature increase by 3° C. and a change of the external appearance of the reaction mixture. After heat generation stopped, the remaining Monomer Emulsion 1 was added gradually to the flask over a period of 60 minutes with stirring, and an aqueous APS initiator solution (2.06 g APS in 131.34 g deionized water) was added gradually to the flask over a period of 70 minutes. And the temperature was maintained at 84-86° C. After Monomer Emulsion 1 and initiator solution were consumed, the reaction mixture was held for 30 min. An aqueous ammonia solution (250 g, 12.5% active) was added into the reactor over 15 minutes and held for 20 minutes to dissolved or partially dissolved the resulting O1 oligomer. Properties of the O1 oligomer were summarized in Table 1. The obtained O1 oligomer was used in the preparation of aqueous polymer dispersions below.

Preparation of Oligomers 2-9 (O2-O9)

O2-O9 oligomers were prepared according to the same procedure as described above for preparing the O1 oligomer, based on formulations described in Table 1. Properties of O2-O9 were also summarized in Table 1. The obtained O2-O9 oligomers were used in the next stage (stage 2) of preparing aqueous multistage polymer dispersions below.

Ten (10) ppm 4-hydroxy-2,2,6,6-tetramethyl-piperidinooxy ("4-hydroxy-TEMPO") and the second 50% Monomer Mixture were charged into the flask, and mixed for 30 minutes. Then a water solution of t-BHP (10.67 g, 4.41% active) and IAA (46.48 g, 1.03% active) was shot into the flask. Polymerization started. The temperature increased by 20-30° C. After exotherm peak, let the temperature drift to 55° C. Hold at 55° C. for 15 minutes. A water solution of t-BHP (10.67 g, 4.41% active) and IAA (46.48 g, 1.03% active) was fed into the flask over 30 minutes followed by cool to 40° C. Then ADH slurry (10.41 g in 30.00 g deioned (DI) water) was added at 40° C. over 10 minutes and held for 20 minutes. The resulting dispersion was cooled to room temperature and filtered to obtain milky aqueous multistage polymer dispersion MP12-60.

Ex 2 Aqueous Multistage Polymer Dispersion MP14-16

Preparation of Monomer Emulsion 2: POLYSTEP P-12A surfactant (4.38 g, 25% by weight of solids) was dissolved in deionized water (145.00 g) with stirring. The monomers EHA, ST, DAAM, based on dosages described in Table 2, were added into the resultant surfactant solution to obtain Monomer Emulsion 2.

TABLE 1

| | Monomer dosage for preparing oligomer (stage 1), gram | | | | | | | Properties of oligomer (stage 1) | | | |
|---|---|---|---|---|---|---|---|---|---|---|---|
| | | | | | | | | Solids, | pH | $T_g^a$, | |
| | MMA | DAAM | MAA | PEM | SSS | AAEM | MMP | wt % | value | ° C. | Mn |
| O1 | 804.19 | 57.60 | 65.13 | 30.65 | | | 18.86 | 27.36 | 9.72 | 100 | 4978$^b$ |
| O2 | 828.29 | 33.51 | 65.13 | 30.65 | | | 18.86 | 26.89 | 9.78 | 104 | 6219$^c$ |
| O3 | 861.81 | | 65.13 | 30.65 | | | 18.86 | 27.00 | 9.90 | 109 | 6219$^c$ |
| O4 | 842.66 | 19.15 | 65.13 | 30.65 | | | 18.86 | 27.00 | 9.48 | 107 | 6219$^c$ |
| O5 | 828.29 | | 65.13 | 30.65 | | 33.51 | 18.86 | 27.15 | 10.12 | 104 | 6219$^c$ |
| O6 | 828.29 | 33.51 | 95.78 | | | | 18.86 | 28.06 | 8.64 | 106 | 6219$^c$ |
| O7 | 828.29 | 33.51 | 65.13 | | 30.65 | | 18.86 | 27.91 | 9.52 | 100 | 6219$^c$ |
| O8 | 828.29 | 33.51 | 47.89 | 47.89 | | | 18.86 | 26.78 | 9.81 | 103 | 6219$^c$ |
| O9 | 749.78 | 33.51 | 143.64 | 30.65 | | | 18.86 | 28.01 | 7.25 | 110 | 6219$^c$ |

$^a T_g$ calculated by the Fox Equation described above;
$^b M_n$ tested by GPC analysis; and
$^c M_n$ calculated according to the method described above.

Example 1 (Ex 1) Aqueous Multistage Polymer Dispersion MP12-60

Preparation of Monomer Mixture: The monomers EHA, ST, DAAM were added into a 1-liter tank with stirring based on dosages described in Table 2. The Monomer Mixture obtained was a clear solution.

A solution containing O1 oligomer obtained above (570.94 g, 27.36% by weight of solids) and deionized water (159.00 g) was added into a 4-neck, 3-liter round bottom flask equipped with a thermocouple, a cooling condenser and an agitator, and was heated to 35° C. under nitrogen atmosphere. Shot 50% of the monomer mixture into the flask and hold 30 minutes with stirring. A water solution of FeSO$_4$·7H$_2$O (1.00 g, 0.15% active) and ethylenediaminetetraacetic acid disodium salt (EDTA) (0.30 g, 1.0% active) was charged into the flask. Then a water solution of tert-butyl hydroperoxide (t-BHP) (10.67 g, 4.41% active) and isoascorbic acid (IAA) (46.48 g, 1.03% active) was shot into the flask. Polymerization started. The temperature increased by 20-30° C. After exotherm peak, let the temperature drift to 55° C. The resulting reaction mixture was hold at 55° C. for 15 minutes and cool to 35° C.

A solution containing O1 oligomer obtained above (570.94 g, 27.36% by weight of solids) was added into a 4-neck, 3-liter round bottom flask equipped with a thermocouple, a cooling condenser and an agitator, and was heated to 89° C. under nitrogen atmosphere. An aqueous APS initiator solution (0.77 g APS in 13.74 g deionized water), and 5% by weight of Monomer Emulsion 2 obtained above were then added into the flask. Within about 5 minutes, initiation of polymerization was confirmed by a temperature increase by 6° C. and a change of the external appearance of the reaction mixture. After heat generation stopped, the remaining Monomer Emulsion 2 was added gradually to the flask over a period of 90 minutes with stirring, and an aqueous APS initiator solution (1.61 g APS in 49.48 g deionized water) was added gradually to the flask over a period of 100 minutes. The temperature was maintained at 84-86° C. Upon completing addition, the reaction mixture was held at 70° C. for 10 minutes. A water solution of FeSO$_4$·7H$_2$O (0.40 g, 0.2% active) and EDTA (0.08 g, 1.0% active) in 10 mL DI water was charged into the flask. A water solution of t-BHP (9.5 g, 3.68% active) and IAA (9.26 g, 2.81% active) was further fed into the flask over 30 minutes followed by cooling to 40° C. Then ADH slurry (10.41 g in 30.00 g DI water) was added at 40° C. over 10 minutes and held for 20 minutes. The resulting dispersion was cooled to room temperature and filtered to obtain the aqueous multistage polymer dispersion MP14-16.

Ex 3 Aqueous Multistage Polymer Dispersion MP14-50

Preparation Monomer Emulsion 2: O1 oligomer obtained above (492.40 g, 26.69% by weight of solids) used as a surfactant was dissolved in deionized water (94.50 g) with stirring. The monomers EHA, ST and DAAM were added into the resultant surfactant solution to obtain Monomer Emulsion 2, based on dosages described in Table 2.

A solution containing O1 oligomer (93.84 g, 26.69% by weight of solids) and 74.00 g water were added into a 4-neck, 3-liter round bottom flask equipped with a thermocouple, a cooling condenser and an agitator, and was heated to 89° C. under nitrogen atmosphere. An aqueous APS initiator solution (0.77 g APS in 13.74 g deionized water), and 5% by weight of Monomer Emulsion 2 obtained above were then added into the flask. Within about 5 minutes, initiation of polymerization was confirmed by a temperature increase by 6° C. and a change of the external appearance of the reaction mixture. After heat generation stopped, the remaining Monomer Emulsion 2 was added gradually to the flask over a period of 90 minutes with stirring, and an aqueous APS initiator solution (1.61 g APS in 49.48 g deionized water) was added gradually to the flask over a period of 100 minutes. The temperature was maintained at 84-86° C. Upon completing addition, the reaction mixture was held at 70° C. for 10 minutes. A water solution of $FeSO_4.7H_2O$ (0.40 g, 0.2% active) and EDTA (0.08 g, 1.0% active) in 10 mL DI water was charged into the flask. A water solution of t-BHP (9.5 g, 3.68% active) and IAA (9.26 g, 2.81% active) was further fed into reactor over 30 minutes followed by cooling to 40° C. Then ADH slurry (10.41 g in 30.00 g DI water) was added at 40° C. over 10 minutes and held for 20 minutes. The resulting dispersion was cooled to room temperature and filtered to obtain the aqueous multistage polymer dispersion MP14-50.

Exs 4-13 Aqueous Multistage Polymer Dispersions

Aqueous polymer dispersions of Exs 4-13 were prepared according to the same procedure as described above for preparing the aqueous multistage polymer dispersion of Ex 3 (MP14-50), based on monomer dosage for preparing oligomers described in Table 1; and oligomer type and dosage, monomer formulations for preparing Monomer Emulsion 2, and the ratio of oligomers of stage 1/polymer of stage 2 made from the Monomer Emulsion 2 described in Table 2.

Preparation of Comp MP05-18 Aqueous Polymer Dispersion

Preparation of Monomer Emulsion 1: Fes-32 surfactant (3.72 grams, 31.00% active) was dissolved in deionized water (69.50 g) with stirring. Then MMA (130.90 g), DAAM (9.33 g), MAA (10.74 g) and PEM (4.98 g) were added into the resultant surfactant solution to obtain Monomer Emulsion 1.

Preparation of Monomer Emulsion 2: Fes-32 surfactant (1.86 g, 31.00% active) was dissolved in deionized water (127 g) with stirring. The monomers EHA (138.52 g), ST (211.42 g), DAAM (14.60 g) were added into the resultant surfactant solution to obtain Monomer Emulsion 2.

A solution containing Fes-32 surfactant (6.2 g, 31.00% active) and deionized water (308.79 g) was added into a 4-neck, 3-liter round bottom flask equipped with a thermocouple, a cooling condenser and an agitator, and was heated to 85° C. under nitrogen atmosphere. An aqueous APS initiator solution (1.0 g APS in 23 g deionized water), and 5% by weight of Monomer Emulsion 1 obtained above were then added into the flask. Within about 5 minutes, initiation of polymerization was confirmed by a temperature increase by 3-6° C. and a change of the external appearance of the reaction mixture. After heat generation stopped, the remaining Monomer Emulsion 1 was added gradually to the flask over a period of 30 minutes with stirring. At the same time, an aqueous APS initiator solution (0.51 g APS in 25.45 g deionized water) was added gradually to the flask over a period of 40 minutes. And the temperature was maintained at 84-86° C. After APS initiator was consumed, Monomer Emulsion 2 obtained above was then added into the flask in the same manner as Monomer Emulsion 1 over 70 minutes. And an aqueous APS initiator solution (0.89 g APS in 44.55 g deionized water) was added gradually to the flask over a period of 70 minutes. Upon completing addition, the reaction mixture was held at 70° C. for 10 minutes. A water solution of t-BHP (10.5 g, 3.33% active) and IAA (10.26 g, 2.53% active) was then fed into the flask over 30 minutes followed by cooling to 40° C. Then ADH slurry (10.41 g in 10.00 g DI water) was added at 40° C. over 10 minutes and held for 20 minutes. The resulting dispersion was cooled to room temperature and filtered to obtain the aqueous polymer dispersion Comp MP05-18.

Preparation of Other Comp Aqueous Polymer Dispersions

Comp MP14-28, Comp MP16-42, Comp MP3605, Comp MP3606, Comp MP12-58, Comp MP18-12, and Comp MP20-80 aqueous polymer dispersions were prepared according to the same procedure as described above for preparing the aqueous polymer dispersion of Ex 3 (MP14-50), wherein monomer dosage for preparing oligomers in stage 1 and polymer in stage 2, and ratios of oligomers in stage 1 to the polymers in stage 2 were described in Tables 1 and 3.

Preparation of Comp MP0716 Aqueous Polymer Dispersion

Preparation of Monomer Emulsion 1: Sodium lauryl sulfate (SLS) surfactant (4.35 grams, 15% active) was dissolved in deionized water (117.40 g) with stirring. Then MMA (124.80 g), DAAM (15.60 g), AA (2.95 g). MAA (12.70 g), ST (19.50 g), butyl acrylate (BA) (19.50 g) and MMP (1.83 g) were added into the resultant surfactant solution to obtain Monomer Emulsion 1.

Preparation of Monomer Emulsion 2: SLS surfactant (8.65 g, 15.00% by weight of solids) was dissolved in deionized water (215.75 g) with stirring. Then BA (314.60 g), MMA (140.40 g) were added into the resultant surfactant solution to obtain Monomer Emulsion 2.

A polymerization vessel equipped with metering devices and temperature regulation was charged at room temperature under a nitrogen atmosphere with 420.25 g of deionized water and 17.35 g of a 15% strength by weight aqueous solution of SLS, and this initial charge was heated to 80° C. with stirring. When this temperature had been reached, an aqueous APS initiator solution (2.60 g APS in 34.8 g deionized water) was added, and the mixture was stirred for 2 minutes. Thereafter Monomer Emulsion 1 was commenced and was metered in over the course of 32 minutes. After the end of Monomer Emulsion 1, polymerization was continued for 10 minutes, then an ammonia solution (12.5 g, 3.2% strength by weight) was added over 10 minutes. The weight-average molecular weight of the polymer, from a sample taken at this point in time, was 23.1 kDa. Subsequently Monomer Emulsion 2 was commenced and was metered incontinuously over the course of 104 minutes, at a constant flow rate. 52 minutes after the start of Monomer Emulsion 2, 15.63 g of a 3.2% strength by weight ammonia solution were added. After the end of Monomer Emulsion 2, the polymerization mixture was reacted for 90 minutes more at 80° C. Then 28.35 g of a 5% strength by weight ammonia solution were added over 5 minutes. Subsequently the aqueous polymer dispersion obtained was cooled to room temperature. At a temperature below 40° C., 65 g of a 25.14% strength by weight aqueous solution of ADH were added. The obtained Comp MP0716 aqueous polymer dispersion has a pH value of 8.04 and solids of 40.76 wt %, wherein $T_g$ of polymer (stage 1) made from the Monomer Emulsion 1 and polymer (stage 2) made from the Monomer Emulsion 2 are 72.7° C. and −21.31° C., respectively, as calculated by the Fox equation described above.

Preparation of Comp MP0717 Aqueous Polymer Dispersion

Comp MP0717 polymer dispersion was prepared according to the same procedure as described above for preparing the aqueous polymer dispersion of Comp MP0716 above, based on the following Monomer Emulsions.

Preparation of Monomer Emulsion 1: SLS surfactant (4.35 grams, 15% active) was dissolved in deionized water (117.40 g) with stirring. Then MMA (124.80 g), DAAM (15.60 g), AA (2.95 g), MAA (12.70 g), ST (19.50 g), and MMP (1.83 g) were added into the resultant surfactant solution to obtain Monomer Emulsion 1.

Preparation of Monomer Emulsion 2: SLS surfactant (8.65 g, 15.00% active) was dissolved in deionized water (215.75 g) with stirring. Then BA (314.60 g), MMA (126.75 g) and DAAM (13.65 g) were added into the resultant surfactant solution to obtain Monomer Emulsion 2.

The obtained Comp MP0717 aqueous dispersion has a pH value of 8.08, and solids of 40.33 wt %, wherein $T_g$ of the polymer made from the Monomer Emulsion 1 and the polymer made from the Monomer Emulsion 2 are 72.7° C. and −23.24° C. respectively, as calculated by the Fox equation described above.

Properties of the aqueous polymer dispersions obtained above are shown in Table 3.

TABLE 3

| Aqueous Multistage Polymer Dispersion | Properties of aqueous multistage polymer dispersion | | $T_g$ (° C.)[a] |
|---|---|---|---|
| | Solids (wt %) | pH value | |
| Ex 1 (MP12-60) | 39.68 | 9.35 | −4.4 |
| Ex 2 (MP14-16) | 42.02 | 9.42 | −4.4 |
| Ex 3 (MP14-50) | 40.35 | 9.35 | −4.4 |
| Ex 4 (MP04-47) | 41.37 | 9.57 | −3.7 |
| Comp MP05-16 | 42.15 | 9.87 | −5.33 |
| Ex 5 (MP16-62) | 41.13 | 9.53 | −3.65 |
| Ex 6 (MP16-66) | 42.33 | 9.6 | −3.7 |
| Ex 7 (MP04-55) | 42.68 | 9.33 | −3.7 |
| Comp MP05-24 | 39.38 | 8.15 | −3.7 |
| Comp MP05-26 | 40.56 | 9.42 | −3.7 |
| Ex 8 (MP04-49) | 41.31 | 9.69 | −3.7 |
| Comp MP05-18 | 36.54 | 9.11 | −4.4 |
| Comp MP14-28 | 42.01 | 9.30 | −2.9 |
| Comp MP16-42 | 40.86 | 9.57 | −5.33 |
| Comp MP3605 | 42.33 | 9.26 | −3.7 |
| Comp MP3606 | 42.28 | 9.19 | −1.86 |
| Comp MP12-58 | 39.53 | 9.33 | −3.95 |
| Comp MP18-12 | 41.42 | 7.13 | −3.7 |
| Comp MP20-80 | Gelled | | −3.7 |

[a] $T_g$ of the polymer (stage 2) made from the Monomer Emulsion 2, as calculated by the Fox Equation described above.

Pigmented Coating Composition

Pigmented coating compositions of Exs 9-16 and Comp Exs A-L comprising aqueous polymer dispersions obtained above were prepared based on formulations described in Table 4. Ingredients of the grind were mixed using a conventional lab mixer. The binder was added into the grind. Then other ingredients of the letdown were added into the resultant mixture. The obtained coating compositions were evaluated according to the test methods described above. Properties of the obtained coating films are shown in Table 6. All the films had a solid content of 49%, a pigment volume concentration (PVC) of about 20%, and a gloss level of 20-30 at 60°.

TABLE 2

| | Oligomer (stage 1), gram | Monomer Mixture or Monomer Emulsion 2 (stage 2), gram | | | | | | Weight ratio* |
|---|---|---|---|---|---|---|---|---|
| | | EHA | ST | DAAM | AAEM | MMA | ADH | |
| Exs 1-3 (MP12-60, MP14-16, MP14-50) | 571.62 (O1) | 138.52 | 211.42 | 14.60 | | | 10.41 | 30/70 |
| Ex 4 (MP04-47) | 581.04 (O2) | 138.52 | 215.08 | 10.94 | | | 10.32 | 30/70 |
| Comp MP05-16 | 578.67 (O3) | 145.82 | 218.72 | | | | | 30/70 |
| Ex 5 (MP16-62) | 576.13 (O5) | 138.52 | 215.08 | | 10.94 | | | 30/70 |
| Ex 6 (MP16-66) | 730.03 (O2) | 138.52 | 215.08 | 10.94 | | | 11.11 | 35/65 |
| Ex 7 (MP04-55) | 903.83 (O2) | 138.52 | 215.08 | 10.94 | | | 12.23 | 40/60 |
| Comp MP05-24 | 556.81 (O6) | 138.52 | 215.08 | 10.94 | | | 10.32 | 30/70 |
| Comp MP05-26 | 559.80 (O7) | 138.52 | 215.08 | 10.94 | | | 10.32 | 30/70 |
| Ex 8 (MP04-49) | 583.42 (O8) | 138.52 | 215.08 | 10.94 | | | 10.32 | 30/70 |
| Comp MP14-28 | 571.62 (O1) | 138.52 | 218.72 | 7.29 | | | 7.61 | 30/70 |
| Comp MP16-42 | 581.04 (O2) | 145.82 | 218.72 | | | | | 30/70 |
| CompMP3605 | 578.67 (O4) | 138.52 | 215.08 | 10.94 | | | 7.10 | 30/70 |
| Comp MP3606 | 571.62 (O1) | 138.52 | 224.19 | 1.82 | | | 5.74 | 30/70 |
| Comp MP12-58 | 571.62 (O1) | 138.52 | 153.11 | 14.60 | | 58.33 | 10.41 | 30/70 |
| Comp MP18-12 | 557.81 (O9) | 138.52 | 215.08 | 10.94 | | | 10.32 | 30/70 |
| Comp MP20-80 | 338.92 (O2) | 138.52 | 215.08 | 10.94 | | | 10.32 | 20/80 |

*Weight ratio of oligomer (stage 1) to polymer (stage 2) made from the Monomer Mixture or the Monomer Emulsion 2.

TABLE 4

Pigmented Coating Composition

| | Function | Loading (g) |
|---|---|---|
| Grind | | |
| Water | Diluent | 4 |
| AMP 95 | Neutralizer | 0.1 |
| OROTAN 731A | Dispersant | 0.5 |
| TEGO 1488 | Defoamer | 0.1 |
| Ti-Pure R-706 | Pigment | 20 |
| Let down | | |
| Water | Diluent | 3 |
| Aqueous polymer dispersion | Binder | 72.6 |
| DOWANOL EB | Coalescent | 3 |
| DOWANOL DPnB | Coalescent | 1.5 |
| TEGO 902W | Defoamer | 0.2 |
| BYK 929 | Matting agent | 1 |
| RM-8W | Rheology modifier | 0.2 |

Clear Coating Composition

Clear coating compositions (Exs 11-clear, 12-clear and 15-clear and Comp Exs E-clear, F-clear and G-clear) comprising aqueous polymer dispersions obtained above were prepared based on formulations described in Table 5. The ingredients listed in Table 5 were mixed using a conventional lab mixer. The obtained clear coating compositions were evaluated according to the alcohol resistance test method described above. Properties of the obtained coating films are shown in Table 7.

TABLE 5

Clear Coating Composition

| Grind | Function | Loading (g) |
|---|---|---|
| Aqueous polymer dispersion | Binder | 72.6 |
| Water | | 19.4 |
| DOWANOL EB | Coalescent | 3 |
| DOWANOL DPnB | Coalescent | 3 |
| TEGO 902W | Defoamer | 0.2 |
| RM-8W | Rheology modifier | 0.3 |
| BYK 929 | Matting agent | 1.5 |

Early block resistance and stain resistance of pigmented coating films, and 48% alcohol resistance of clear coatings were evaluated and provided in Tables 6 and 7, respectively. Table 6 provides early block resistance and coffee resistance of pigmented coating films. As shown in Table 6, coating compositions of Exs 9-16 comprising aqueous polymer dispersions of the present invention provided coating films with acceptable coffee stain resistance, as indicated by delta E value higher than 0.6. The MP14-50 aqueous polymer dispersion provided a MFFT of 46° C. and the coating composition of Ex 11 comprising thereof showed good hiding with a contrast ratio of 91.50%. In addition, the coating composition of Ex 11 also provided coating films with stain resistance to green tea, wine, sauce, and vinegar, respectively, all being 2 according to the test method described above. In contrast, coating compositions of Comp Exs A, B, D-F, and H-L all provided coating films with unacceptable coffee resistance as shown in Table 6. Coating composition of Comp Ex C comprising Comp MP14-28 polymer dispersion showed unacceptable early block resistance.

Table 7 provides 48% alcohol resistance of clear coatings. As shown in Table 7, clear coating compositions of Ex 11-Clear, Ex 12-Clear and Ex 15-Clear comprising MP14-50, MP04-47 and MP16-62 binders, respectively, all provided coating films with acceptable alcohol resistance. When using AAEM as crosslinkers at both stages, the obtained MP16-62 polymer dispersion provided a little yellowing and not pure white dry coating films. In contrast, clear coating compositions (Comp Ex E-Clear and Comp Ex G-Clear) comprising Comp MP3605 polymer dispersion and Comp MP16-42 polymer dispersion, respectively, provided coating films with unacceptable alcohol resistance.

TABLE 6

| | | Coating films (20% PVC, gloss ~20@60°) | |
|---|---|---|---|
| Coating Composition | Binder | Early block resistance | Coffee resistance ΔE |
| Ex 9 | MP12-60 | B-0 | 0.4 |
| Ex 10 | MP14-16 | B-0 | 0.3 |
| Ex 11 | MP14-50 | B-0 | 0.4 |
| Comp Ex A | MP05-18 | / | 0.9 |
| Comp Ex B | MP12-58 | / | 0.8 |
| Ex 12 | MP04-47 | B-1 | 0.3 |
| Ex 13 | MP16-66 | / | 0.2 |
| Ex 14 | MP04-55 | B-1 | 0.4 |
| Comp Ex C | MP14-28 | D-1 | 0.52 |
| Comp Ex D | MP05-16 | / | 1.0 |
| Comp Ex E | MP3605 | / | 1.1 |
| Comp Ex F | MP3606 | / | 1.6 |
| Comp Ex G | MP16-42 | B-0 | 0.4 |
| Comp Ex H | MP0716 | / | 2.18 |
| Comp Ex I | MP0717 | / | 2.38 |
| Ex 15 | MP16-62 | B-0 | 0.3 |
| Comp Ex J | MP05-24 | / | 0.7 |
| Comp Ex K | MP05-26 | / | 0.8 |
| Ex 16 | MP04-49 | B-1 | 0.5 |
| Comp Ex L | MP18-12 | / | 0.7 |

TABLE 7

| Coating Composition | Binder | 48% alcohol resistance (Clear coats) |
|---|---|---|
| Ex 11-Clear | MP14-50 | 4 |
| Ex 12-Clear | MP04-47 | 3 |
| Comp Ex E-Clear | MP3605 | 2 |
| Comp Ex F-Clear | MP3606 | 3 |
| Comp Ex G-Clear | MP16-42 | 2 |
| Ex 15-Clear | MP16-62 | 3 |

Table 8 shows coffee resistance, water resistance, wet/dry rubbing, alcohol resistance, fat resistance, scratch on fat and dry heat resistance of coating films made from the coating composition of Ex 11 comprising MP14-50 polymer dispersion. Matt pigmented white top coats made from the coating composition of Ex 11 showed water resistance, paraffin oil resistance, coffee resistance, dry heat performance, fastness to rubbing, and fat on scratch performance all being rated as 5.

TABLE 8

| Test according to IOS-MAT-0066: AA-163938-8, 2 2.1 A R2; Water 24 h EN12720: 2009 | Rating | |
|---|---|---|
| 2.1 Water 24 h, EN 12720: 2009: Min value 4, IOS-MAT-0066, AA-163938-8 | 5 | + |
| 2.2 Water 24 h, EN 12720: 2009: Min value 4, IOS-MAT-0066, AA-163938-8 | 5 | + |

TABLE 8-continued

| | Test | Rating | |
|---|---|---|---|
| 3 | Test according to IOS-MAT-0066: AA-163938-5, 2.1A R2; Liquid paraffin 24 h EN 12720: 2009 | Rating | |
| 3.1 | Fat 24 h, EN 12720: 2009: Min value 4, IOS-MAT-0066, AA-163938-8 | 5 | + |
| 3.2 | Fat 24 h, EN 12720: 2009: Min value 4, IOS-MAT-0066, AA-163938-8 | 5 | + |
| 5 | Test according to IOS-MAT-0066: AA-163938-8, 2.1A R2; Coffee 1 h EN 12720: 2009 | Rating | |
| 5.1 | Coffee 1 h, EN 12720: 2009: Min value 4, IOS-MAT-0066, AA-163938-8 | 5 | + |
| 5.2 | Coffee 1 h, EN 12720: 2009: Min value 4, IOS-MAT-0066, AA-163938-8 | 5 | + |
| 6 | Test according to IOS-MAT-0066: AA-163938-8, 2.1A R2; Dry heat EN 12722: 2009 | Rating | |
| 6.1 | Dry heat 70° C., 20 mins, EN 12722: 2009: in value 4, IOS-MAT-0066, AA-163938-8 | 5 | + |
| 7 | Test according to IOS-MAT-0066: AA-163938-8, 2.1A R2; fastness to rubbing, IOS-TM-0002, AA-14884-8 section 4 | Rating | |
| 7.1 | Dry rubbing, 10 × 9N, IOS-TM-0002/4, Min value 4, IOS-MAT-0066, AA-163938-8 | 5 | + |
| 7.2 | Wet rubbing, 10 × 9N, IOS-TM-0002/4, Min value 3-4, IOS-MAT-0066, AA-163938-8 | 5 | + |
| 8 | Test according to IOS-MAT-0066: AA-163938-8, 2.1B R2; Fat on scratch 3N + 24 h, IOS-TM-0002, AA-14884-8 section 2 | Rating | |
| 8.1 | Resistance to fat on scratch, 3N + 24 h, IOS-TM-0002/2: Min value 4, width of scratch not more than 0.5 mm, IOS-MAT-0066, AA-163938-8 | 5 0.2 mm | + |

What is claimed is:

1. An aqueous dispersion of a multistage polymer, wherein the multistage polymer comprises:
   (A) a polymer A comprises as polymerized units, based on the weight of the polymer A,
      (a1) from 75% to 92% by weight of a hydrophilic (meth)acrylic acid alkyl ester;
      (a2) from 2.1% to 10% by weight of a carbonyl-containing functional monomer; and
      (a3) from 5% to 15% by weight of an acid monomer comprising from 4% to 14% by weight of an α,β-ethylenically unsaturated carboxylic acid and from 1% to 9% by weight of a phosphorous-containing acid monomer, and
      wherein the polymer A has a number average molecular weight of from 3,000 to 100,000; and
   (B) a polymer B comprises as polymerized units, based on the weight of the polymer B,
      (b1) from 81% to 99% by weight of a hydrophobic monomer selected from a vinyl aromatic monomer, a hydrophobic (meth)acrylic acid alkyl ester, or mixtures thereof;
      (b2) from 0.8% to 10% by weight of a carbonyl-containing functional monomer; and
      (b3) from 0 to 15% by weight of a hydrophilic monomer;
   wherein the polymer B has a glass transition temperature at least 40° C. lower than that of the polymer A, and the weight ratio of the polymer A to the polymer B is from 25:75 to 50:50.

2. The aqueous dispersion of claim 1, wherein the carbonyl-containing functional monomers (a2) and (b2) are each independently selected from diacetone acrylamide.

3. The aqueous dispersion of claim 1, further comprising from 0.5% to 10% by weight of a polyfunctional carboxylic hydrazide containing at least two hydrazide groups per molecule, based on the total weight of the polymer A and polymer B.

4. The aqueous dispersion of claim 3, wherein the polyfunctional carboxylic hydrazide is selected from adipic dihydrazide, oxalic dihydrazide, isophthalic dihydrazide, polyacrylic polyhydrazide, or mixtures thereof.

5. The aqueous dispersion of claim 1, wherein the phosphorous-containing acid monomer is selected from phosphoethyl (meth)acrylate, phosphopropyl (meth)acrylate, phosphobutyl (meth)acrylate, or mixtures thereof.

6. The aqueous dispersion of claim 1, wherein the hydrophilic (meth)acrylic acid alkyl ester is selected from methyl (meth)acrylate, ethyl (meth)acrylate, or mixtures thereof.

7. The aqueous dispersion of claim 1, wherein the hydrophobic monomer is selected from styrene or substituted styrene, butyl (meth)acrylate, iso-butyl (meth)acrylate, 2-ethylhexyl acrylate, lauryl (meth)acrylate, stearyl (meth)acrylate, or mixtures thereof.

8. The aqueous dispersion of claim 1, wherein the polymer A has a number average molecular weight of from 3,000 to 30,000.

9. The aqueous dispersion of claim 1, wherein the weight ratio of the polymer A to the polymer B is from 30:70 to 40:60.

10. The aqueous dispersion of claim 1, wherein the polymer A has a glass transition temperature of from 60 to 110° C., and the polymer B has a glass transition temperature of −20° C. or higher.

11. The aqueous dispersion of claim 1, wherein the polymer A comprises as polymerized units, based on the weight of the polymer A,
   (a1) from 80% to 90% by weight of the hydrophilic (meth)acrylic acid alkyl ester;
   (a2) from 3% to 6% by weight of the carbonyl-containing functional monomer; and
   (a3) from 7% to 13% by weight of the acid monomer comprising from 4% to 10% by weight of the α,β-ethylenically unsaturated carboxylic acid and from 3% to 6% by weight of the phosphorous-containing acid monomer; and
   the polymer B comprises as polymerized units, based on the weight of the polymer B,
   (b1) from 81% to 99% by weight of the hydrophobic monomer selected from a vinyl aromatic monomer, a hydrophobic (meth)acrylic acid alkyl ester, or mixtures thereof;
   (b2) from 2.5% to 10% by weight of the carbonyl-containing functional monomer; and
   (b3) from 0 to 15% by weight of the hydrophilic monomer.

12. An aqueous coating composition comprising the aqueous dispersion of claim 1.

13. A process of preparing an aqueous dispersion of a multistage polymer by a multistage free-radical polymerization, comprising:
   (i) preparing a polymer A in an aqueous medium by a free-radical polymerization in the presence of a chain transfer agent and neutralizing the obtained polymer A to a pH value of at least 6, wherein the polymer A comprises as polymerized units, based on the weight of the polymer A,
      (a1) from 75% to 92% by weight of a hydrophilic (meth)acrylic acid alkyl ester;

(a2) from 2.1% to 10% by weight of a carbonyl-containing functional monomer; and (a3) from 5% to 15% by weight of an acid monomer comprising from 4% to 14% by weight of an α,β-ethylenically unsaturated carboxylic acid and from 1% to 9% by weight of a phosphorous-containing acid monomer; and (ii) preparing a polymer B in the presence of the polymer A obtained from step (i) by a free-radical polymerization, wherein the polymer B comprises as polymerized units, based on the weight of the polymer B, (b1) from 81% to 99% by weight of a hydrophobic monomer selected from a vinyl aromatic monomer, a hydrophobic (meth)acrylic acid alkyl ester, or mixtures thereof;

(b2) from 0.8% to 10% by weight of a carbonyl-containing functional monomer; and (b3) from 0 to 15% by weight of a hydrophilic monomer; and wherein the polymer B has a glass transition temperature at least 40° C. lower than that of the polymer A, and the weight ratio of the polymer A to the polymer B is from 25:75 to 50:50.

14. A process of preparing an aqueous dispersion of a multistage polymer by a multistage free-radical polymerization, comprising:

(i) preparing a polymer B in an aqueous medium in the presence of a surfactant by a free-radical polymerization, wherein the polymer B comprises as polymerized units, based on the weight of the polymer B, (b1) from 81% to 99% by weight of a hydrophobic monomer selected from a vinyl aromatic monomer, a hydrophobic (meth)acrylic acid alkyl ester, or mixtures thereof;

(b2) from 0.8% to 10% by weight of a carbonyl-containing functional monomer; and (b3) from 0 to 15% by weight of a hydrophilic monomer; and (ii) preparing a polymer A by a free-radical polymerization in the presence of a chain transfer agent and neutralizing the obtained multistage polymer to a pH value of at least 7, wherein the polymer A comprises as polymerized units, based on the weight of the polymer A, (a1) from 75% to 92% by weight of a hydrophilic (meth)acrylic acid alkyl ester;

(a2) from 2.1% to 10% by weight of a carbonyl-containing functional monomer; and (a3) from 5% to 15% by weight of an acid monomer comprising from 4% to 14% by weight of an α,β-ethylenically unsaturated carboxylic acid and from 1% to 9% by weight of a phosphorous-containing acid monomer; and wherein the polymer B has a glass transition temperature at least 40° C. lower than that of the polymer A, and the weight ratio of the polymer A to the polymer B is from 25:75 to 50:50.

* * * * *